(12) United States Patent
Du et al.

(10) Patent No.: US 11,475,295 B2
(45) Date of Patent: Oct. 18, 2022

(54) PREDICTING AND VISUALIZING OUTCOMES USING A TIME-AWARE RECURRENT NEURAL NETWORK

(71) Applicant: Adobe Inc., San Jose, CA (US)

(72) Inventors: Fan Du, Milpitas, CA (US); Eunyee Koh, San Jose, CA (US); Sungchul Kim, San Jose, CA (US); Shunan Guo, ShangHai (CN); Sana Malik Lee, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 454 days.

(21) Appl. No.: 16/394,227

(22) Filed: Apr. 25, 2019

(65) Prior Publication Data
US 2020/0342305 A1 Oct. 29, 2020

(51) Int. Cl.
*G06N 3/04* (2006.01)
*G06N 3/08* (2006.01)
(Continued)

(52) U.S. Cl.
CPC ............ *G06N 3/08* (2013.01); *G06N 3/0454* (2013.01); *G06N 5/02* (2013.01); *G06N 7/005* (2013.01); *G06N 20/10* (2019.01)

(58) Field of Classification Search
CPC .......... G06N 3/08; G06N 7/005; G06N 20/10; G06N 5/02; G06N 3/0454
See application file for complete search history.

(56) References Cited

U.S. PATENT DOCUMENTS 8,234,179 B2 * 7/2012 Sundaresan ........ G06Q 30/0603
705/26.1
10,936,947 B1 * 3/2021 Flunkert .............. G06N 3/0445
(Continued)

FOREIGN PATENT DOCUMENTS

WO WO-2019172848 A1 * 9/2019 ............... G06N 3/08

OTHER PUBLICATIONS

S. Malik, F. Du, M. Monroe, E. Onukwugha, C. Plaisant, and B. Shneiderman, "Cohort Comparison of Event Sequences with Balanced Integration of Visual Analytics and Statistics", IUI , p. 38-49. ACM, (2015) (Year: 2015).*
(Continued)

*Primary Examiner* — Hal Schnee
(74) *Attorney, Agent, or Firm* — Kilpatrick Townsend & Stockton LLP

(57) ABSTRACT

Disclosed systems and methods predict and visualize outcomes based on past events. For example, an analysis application encodes a sequence of events into a feature vector that includes, for each event, a numerical representation of a respective category and a respective timestamp. The application applies a time-aware recurrent neural network to the feature vector, resulting in one or more of (i) a set of future events in which each event is associated with a probability and a predicted duration and (ii) a sequence embedding that contains information about predicted outcomes and temporal patterns observed in the sequence of events. The application applies a support vector model classifier to the sequence embedding. The support vector model classifier computes a likelihood of a categorical outcome for each of the events in the probability distribution. The application modifies interactive content according to the categorical outcomes and probability distribution.

20 Claims, 9 Drawing Sheets

(51) Int. Cl.
G06N 5/02 (2006.01)
G06N 7/00 (2006.01)
G06N 20/10 (2019.01)

(56) References Cited

U.S. PATENT DOCUMENTS

| | | | | |
|---|---|---|---|---|
| 2003/0097617 | A1* | 5/2003 | Goeller | G06F 11/0748 714/39 |
| 2010/0250647 | A1* | 9/2010 | Rajan | G06F 16/972 709/203 |
| 2020/0104288 | A1* | 4/2020 | Tao | G06N 20/00 |
| 2020/0327444 | A1* | 10/2020 | Negi | G06N 3/04 |

OTHER PUBLICATIONS

Baytas, Inci M., et al. "Patient subtyping via time-aware LSTM networks." Proceedings of the 23rd ACM SIGKDD international conference on knowledge discovery and data mining. 2017. (Year: 2017).*
Aerts et al., Testing Popular Visualization Techniques for Representing Model Uncertainty, Cartography and Geographic Information Science, vol. 30, No. 3, 2003, pp. 249-261.
Arshad et al., Investigating User Confidence for Uncertainty Presentation in Predictive Decision Making, In Proceedings of the Annual Meeting of the Australian Special Interest Group for Computer Human Interaction, Dec. 7-10, 2015, pp. 352-360.
Attenberg et al., Modeling and Predicting User Behavior in Sponsored Search, In KDD, Available online at: http://engineering.nyu.edu/~suel/papers/sponsored.pdf, Jun. 28-Jul. 1, 2009, 9 pages.
Bade et al., Connecting Time-Oriented Data and Information to a Coherent Interactive Visualization, In Proceedings of the SIGCHI Conference on Human Factors in Computing Systems, Available online at: http://ifs.tuwien.ac.at/~silvia/wien/vu-infovis/articles/bad_chi2004.pdf, Apr. 24-29, 2004, 8 pages.
Baytas et al., Patient Subtyping via Time-Aware LSTM Networks, In KDD, Available online at: http://biometrics.cse.msu.edu/Publications/MachineLearning/Baytasetal_PatientSubtypingViaTimeAwareLSTMNetworks.pdf, Aug. 13-17, 2017, 10 pages.
Bengio et al., Learning Long-Term Dependencies with Gradient Descent is Difficult, IEEE Transactions on Neural Networks, vol. 5, No. 2, Mar. 1994, pp. 157-166.
Bonneau et al., Overview and State-of-the-Art of Uncertainty Visualization, Scientific Visualization, Available online at: http://www.sci.utah.edu/publications/Bon2014a/Overview-Uncertainty-Visualization-2015.pdf, Sep. 19, 2014, pp. 5-30.
Boukhelifa et al., Evaluating Sketchiness as a Visual Variable for the Depiction of Qualitative Uncertainty, IEEE Transactions on Visualization and Computer Graphics, vol. 18, No. 12, Dec. 9, 2012, pp. 2769-2778.
Bowman et al., Generating Sentences from a Continuous Space, Proceedings of the 20th SIGNLL Conference on Computational Natural Language Learning, Available online at: https://arxiv.org/pdf/1511.06349.pdf, 2015, 12 pages.
Brodlie et al., A Review of Uncertainty in Data Visualization, Expanding the Frontiers of Visual Analytics and Visualization, Apr. 17, 2012, pp. 81-109.
Cedilnik et al., Procedural Annotation of Uncertain Information, Proceedings of the Conference on Visualization, 2000, 5 pages.
Chen et al., KATE: K-Competitive Autoencoder for Text, In KDD, Available online at: https://arxiv.org/pdf/1705.02033.pdf, Aug. 13-17, 2017, 10 pages.
Chen et al., Predictive Analysis by Leveraging Temporal User Behavior and User Embeddings, In ACM, International Conference on Information and Knowledge Management, Available online at: http://ryanrossi.com/pubs/CIKM18-pred-analysis-user-embeddings.pdf, Oct. 22-26, 2018, 8 pages.
Cho et al., Learning Phrase Representations Using RNN Encoder-Decoder for Statistical Machine Translation, Proceedings of the 2014 Conference on Empirical Methods in Natural Language Processing (EMNLP), Available online at: https://arxiv.org/pdf/1406.1078.pdf, Oct. 25-29, 2014, pp. 1724-1734.
Choi et al., Multi-layer Representation Learning for Medical Concepts, In KDD, Available online at: https://www.kdd.org/kdd2016/papers/files/rpp0303-choiA.pdf, Aug. 13-17, 2016, 10 pages.
Collins et al., Visualization of Uncertainty in Lattices to Support Decision-Making, In EuroVis., Available online at: http://innovis.cpsc.ucalgary.ca/innovis/uploads/Publications/Publications/Collins_2007_lattices.pdf, May 23-25, 2007, 8 pages.
Correll et al., Value-Suppressing Uncertainty Palettes, In Proceedings of the SIGCHI Conference on Human Factors in Computing Systems, Paper No. 642, Apr. 21-26, 2018, pp. 1-11.
Du et al., Coping with Volume and Variety in Temporal Event Sequences: Strategies for Sharpening Analytic Focus, IEEE Transactions on Visualization and Computer Graphics, vol. 23, No. 6, Jun. 2017, pp. 1636-1649.
Du et al., EventAction: Visual Analytics for Temporal Event Sequence Recommendation, IEEE Conference on Visual Analytics Science and Technology (VAST), Available online at: http://frankdu.org/papers/du2016vis.pdf, Oct. 23-28, 2016, pp. 61-70.
Du et al., Finding Similar People to Guide Life Choices: Challenge, Design, and Evaluation, In Proceedings of the SIGCHI Conference on Human Factors in Computing Systems, May 6-11, 2017, pp. 5498-5544.
Esteban et al., Predicting Sequences of Clinical Events by Using a Personalized Temporal Latent Embedding Model, In ICHI, IEEE, Available online at: https://arxiv.org/pdf/1602.02685.pdf, Nov. 17, 2016, 9 pages.
Finger et al., Utilizing Graphical Formats to Convey Uncertainty in a Decision Making Task, Theoretical Issues in Ergonomics Science, vol. 3, No. 1, 2002, 4 pages.
Gers et al., Learning to Forget: Continual Prediction with LSTM, Proc ICANN'99, Int. Conf. on Artificial Neural Networks, vol. 2, 1999, pp. 850-855.
Gortler et al., Bubble Treemaps for Uncertainty Visualization, IEEE Transactions on Visualization and Computer Graphics, vol. 24, No. 1, Jan. 2018, 10 pages.
Gotz et al., DecisionFlow: Visual Analytics for High-Dimensional Temporal Event Sequence Data, IEEE Transactions on Visualization and Computer Graphics, vol. 20, No. 12, Dec. 31, 2014, pp. 1-10.
Goyal et al., Effects of Sensemaking Translucence on Distributed Collaborative Analysis, In Proceedings of the ACM Conference on Computer-Supported Cooperative Work and Social Computing, Feb. 27-Mar. 2, 2016, 15 pages.
Goyal et al., Intelligent Interruption Management Using Electro Dermal Activity Based Physiological Sensor for Collaborative Sensemaking, Proceedings of the ACM on Interactive, Mobile, Wearable and Ubiquitous Technologies, vol. 1, No. 3, Article 52, Sep. 2017, pp. 52-52.21.
Graepel et al., Web-Scale Bayesian Click-Through Rate Prediction for Sponsored Search Advertising in Microsoft's Bing Search Engine, In ICML, Available online at: https://quinonero.net/Publications/AdPredictorICML2010-final.pdf, 2010, 8 pages.
Graves, Supervised Sequence Labelling with Recurrent Neural Networks, Springer, vol. 385, Available online at: https://www.cs.toronto.edu/~graves/preprint.pdf, Feb. 6, 2012, 137 pages.
Grbovic et al., E-commerce in Your Inbox: Product Recommendations at Scale, In KDD, Available online at: https://arxiv.org/pdf/1606.07154v1.pdf, Aug. 10-13, 2015, 10 pages.
Gregor et al., DRAW: A Recurrent Neural Network for Image Generation, Proceedings of the 32nd International Conference on Machine Learning, vol. 37, 2015, 10 pages.
Greis et al., Input Controls for Entering Uncertain Data: Probability Distribution Sliders, Proceedings of the ACM on Human-Computer Interaction, vol. 1, No. 3, Jun. 2017, pp. 2-2.17.
Greis et al., Uncertainty Visualization Influences How Humans Aggregate Discrepant Information, In Proceedings ofthe SIGCHI Conference on Human Factors in Computing Systems, Apr. 21-26, 2018, 12 pages.

(56) References Cited

OTHER PUBLICATIONS

Guy et al., Personalized Recommendation of Social Software Items Based on Social Relations, In ReeSys, Available online at: http://research.ibm.com/haifa/dept/imt/papers/guyRecSys09.pdf, Oct. 23-25, 2009, pp. 53-60.
Han et al., Varieties of Uncertainty in Health Care: A Conceptual Taxonomy, Medical Decision Making, vol. 31, No. 6, Nov.-Dec. 2011, pp. 828-838.
Harbaugh et al., Prospect Theory in Choice and Pricing Tasks, University of Oregon Economics Working Paper No. 2002-2, Jul. 15, 2002, 45 pages.
Harrison et al., Timelines: An Interactive System for the Collection and Visualization of Temporal Data, In Graphics Interface, 1994, pp. 141-148.
Hilbe et al., Logistic Regression, SpringerLink, In International Encyclopedia of Statistical Science, Available online at: https://link.springer.com/referenceworkentry/10.1007%2F978-3-642-04898-2_344, Dec. 2, 2014, pp. 1-3.
Hochreiter et al., Long Short-Term Memory, Neural Computation, vol. 9, No. 8, 1997, pp. 1735-1780.
Huang, Exploratory Visualization of Data with Variable Quality. Ph.D. Dissertation, Worcester Polytechnic Institute, Jan. 2005, 94 pages.
Hullman et al., In Pursuit of Error: A Survey of Uncertainty Visualization Evaluation, IEEE Transactions on Visualization and Computer Graphics, vol. 25, No. 1, 2019, 11 pages.
Joslyn et al., Decisions with Uncertainty: The Glass Half Full, Current Directions in Psychological Science, vol. 22, No. 4, 2013, pp. 1-9.
Joslyn et al., The Effect of Probabilistic Information on Threshold Forecasts, Weather and Forecasting, vol. 22, No. 4, Aug. 2007, pp. 804-812.
Joslyn et al., Uncertainty Forecasts Improve Weather-Related Decisions and Attenuate the Effects of Forecast Error, Journal of Experimental Psychology: Applied, vol. 18, No. 1, 2012, pp. 126-140.
Kahneman et al., Prospect Theory: An Analysis of Decision Under Risk, Econometrica, The Econometric Society, vol. 47, No. 2, Mar. 1979, 33 pages.
Karam, Visualization Using Timelines, In Proceedings of the ACM International Symposium on Software Testing and Analysis, 1994, pp. 125-137.
Kiela et al., Learning Image Embeddings using Convolutional Neural Networks for Improved Multi-Modal Semantics, Proceedings of the 2014 Conference on Empirical Methods in Natural Language Processing (EMNLP), Available online at: https://pdfs.semanticscholar.org/2ec2/f8cd6cf1a393acbc7881b8c81a78269cf5f7.pdf, Oct. 25-29, 2014, pp. 36-45.
Kochenderfer et al., Decision Making Under Uncertainty: Theory and Application, MIT Press, 2015, 76 pages.
Koren et al., Matrix Factorization Techniques for Recommender Systems, Computer, vol. 42, No. 8, Aug. 2009, pp. 42-49.
Krause et al., Interacting with Predictions: Visual Inspection of Black-box Machine Learning Models, Proceedings of the 2016 CHI Conference on Human Factors in Computing Systems, ACM, May 7-12, 2016, 12 pages.
Kuhn et al., Applied Predictive Modeling, Springer, vol. 26, 2013, 615 pages.
Kumpf et al., Visualizing Confidence in Cluster-Based Ensemble Weather Forecast Analyses, IEEE Transactions on Visualization and Computer Graphics, vol. 24, No. 1, Jan. 2018, pp. 109-119.
Le et al., Distributed Representations of Sentences and Documents, Proceedings of the 31st International Conference on International Conference on Machine Learning, vol. 32, Jun. 21-26, 2014, 9 pages.
Leclerc et al., The Cry Wolf Effect and Weather-Related Decision Making, Risk Analysis, vol. 35, No. 3, Jan. 27, 2015, pp. 1-11.
Li et al., News Recommendation via Hypergraph Learning: Encapsulation of User Behavior and News Content, In WSDM, Available online at http://citeseerx.ist.psu.edu/viewdoc/download?doi=10.1.1.352.7403&rep=rep1&type=pdf, Feb. 4-8, 2013, pp. 305-314.
Liu et al., An Uncertainty-Aware Approach for Exploratory Microblog Retrieval, IEEE Transactions on Visualization and Computer Graphics, vol. 22, No. 1, Jan. 31, 2016, 10 pages.
MacEachren et al., Visualizing Uncertain Information, Cartographic Perspectives, No. 13, 1992, pp. 10-19.
Malik et al., Cohort Comparison of Event Sequences with Balanced Integration of Visual Analytics and Statistics, In Proceedings of the International Conference on Intelligent User Interfaces, Mar. 29-Apr. 1, 2015, pp. 38-49.
Mangalampalli et al., A Feature-Pair-based Associative Classification Approach to Look-alike Modeling for Conversion-Oriented User-Targeting in Tail Campaigns, In WWW, Available online at: http://citeseerx.ist.psu.edu/viewdoc/download?doi=10.1.1.301.7365&rep=rep1&type=pdf, Mar. 28-Apr. 1, 2011, pp. 85-86.
Mikolov et al., Distributed Representations of Words and Phrases and their Compositionality, Advances in Neural Information Processing Systems, vol. 2, Dec. 5-10, 2013, pp. 1-9.
Monroe et al., Temporal Event Sequence Simplification, IEEE Transactions on Visualization and Computer Graphics, vol. 19, No. 12, Dec. 2013, 10 pages.
Munzner, A Nested Process Model for Visualization Design and Validation, IEEE Transactions on Visualization and Computer Graphics, vol. 15, No. 6, Nov. 2009, 8 pages.
Pang et al., Approaches to Uncertainty Visualization, The Visual Computer, vol. 13, No. 8, 1997, 24 pages.
Perer et al., Data-Driven Exploration of Care Plans for Patients, In CHI Extended Abstracts on Human Factors in Computing Systems, Apr. 27-May 2, 2013, 6 pages.
Pham et al., DeepCare: A Deep Dynamic Memory Model for Predictive Medicine, Proceedings, Part II, of the 20th Pacific-Asia Conference on Advances in Knowledge Discovery and Data Mining, vol. 9652, Apr. 19-22, 2016, 12 pages.
Plaisant et al., Lifelines: Using Visualization to Enhance Navigation and Analysis of Patient Records, In Proceedings of the AMIA Symposium, Oct. 1998, pp. 76-80.
Plaisant et al., LifeLines: Visualizing Personal Histories, In Proceedings of the SIGCHI Conference on Human Factors in Computing Systems, Apr. 13-18, 1996, pp. 221-227.
Ramos et al., Do Probabilistic Forecasts Lead to Better Decisions?, Hydrology and Earth System Sciences, vol. 17, No. 6, 2013, pp. 2219-2232.
Rhodes et al., Uncertainty Visualization Methods in Isosurface Rendering, In Eurographics, 2007, 7 pages.
Riehmann et al., Interactive Sankey Diagrams, In IEEE Symposium on Information Visualization, 2005, 31 pages.
Riveiro, Evaluation of Uncertainty Visualization Techniques for Information Fusion, In International Conference on Information Fusion, 2007, 8 pages.
Rocktaschel et al., Reasoning about Entailment with Neural Attention, In ICLR, Available online at: https://arxiv.org/pdf/1509.06664.pdf, 2016, pp. 1-9.
Rumelhart et al., Learning Representations by Back-Propagating Errors, Nature, vol. 323, Oct. 9, 1986, pp. 533-536, 4 pages.
Sacha et al., The Role of Uncertainty, Awareness, and Trust in Visual Analytics, IEEE Transactions on Visualization and Computer Graphics, vol. 22, No. 1, Jan. 2016, pp. 240-249.
Siegel, Predictive Analytics: The Power to Predict Who Will Click, Buy, Lie, or Die, Healthcare Informatics Research, vol. 19, No. 1, Mar. 2013, pp. 63-65.
Simianu et al., Understanding Clinical and Nonclinical Decisions Under Uncertainty: A Scenario-Based Survey, BMC Medical Informatics and Decision Making, vol. 16, No. 153, Dec. 1, 2016, pp. 1-9.
Srivastava et al., Dropout: A Simple Way to Prevent Neural Networks from Overfitting, Journal of Machine Learning Research, vol. 15, No. 1, Jun. 2014, pp. 1929-1958.
Srivastava et al., Unsupervised Learning of Video Representations Using LSTMs, Proceedings of International Conference on Machine Learning, Jan. 4, 2016, 12 pages.

(56) References Cited

OTHER PUBLICATIONS

Tak et al., The Perception of Visual Uncertainty Representation by Non-Experts, IEEE Transactions on Visualization and Computer Graphics, vol. 20, No. 6, Jun. 2014, 10 pages.

Van Den Oord et al., Pixel Recurrent Neural Networks, Proceedings of the 33rd International Conference on Machine Learning, vol. 48, Aug. 19, 2016, 10 pages.

Vosough et al., Visualizing Uncertainty in Flow Diagrams: A Case Study in Product Costing, In Proceedings of the 10th International Symposium on Visual Information Communication and Interaction, Aug. 14-16, 2017, pp. 1-8.

Wang et al., Sentence Embedding for Neural Machine Translation Domain Adaptation, In ACL, vol. 2, Jul. 30-Aug. 4, 2017, pp. 560-566.

Weber et al., A Domainspecific Risk-Attitude Scale: Measuring Risk Perceptions and Risk Behaviors, Journal of Behavioral Decision Making, vol. 15, Aug. 1, 2002, pp. 263-290.

Winkler, The Importance of Communicating Uncertainties in Forecasts: Overestimating the Risks from Winter Storm Juno, Risk Analysis, vol. 35, No. 3, Apr. 7, 2015, 15 pages.

Wittenbrink et al., Glyphs for Visualizing Uncertainty in Vector Fields, IEEE Transactions on Visualization and Computer Graphics, vol. 2, No. 3, Sep. 1996, pp. 266-279.

Wongsuphasawat et al., Exploring Flow, Factors, and Outcomes of Temporal Event Sequences with the Outflow Visualization, IEEE Transactions on Visualization and Computer Graphics, vol. 18, No. 12, Dec. 2012, 10 pages.

Wongsuphasawat et al., LifeFlow: Visualizing an Overview of Event Sequences, In Proceedings of the SIGCHI Conference on Human Factors in Computing Systems, May 7-12, 2011, pp. 1747-1756.

Wongsuphasawat et al., Using Visualizations to Monitor Changes and Harvest Insights from a Global-Scale Logging Infrastructure at Twitter, In IEEE Conference on Visual Analytics Science and Technology, Nov. 9-14, 2014, pp. 113-122.

Xiong et al., Relational Click Prediction for Sponsored Search, In WSDM, Available online at: https://www.microsoft.com/en-us/research/wp-content/uploads/2012/02/relational_click_prediction_for_sponsored_search.pdf, Feb. 8-12, 2012, pp. 493-502.

Yang et al., Personalizing Software and Web Services by Integrating Unstructured Application Usage Traces, In WWW Companion, Available online at: https://www.cs.cornell.edu/~ylongqi/paper/YangFJHE17.pdf, Apr. 3-7, 2017, 9 pages.

Yin et al., A Temporal Context-Aware Model for User Behavior Modeling in Social Media Systems, In SIGMOD, Available online at: http://net.pku.edu.cn/~cuibin/Papers/2014%20SIGMOD-TCAm.pdf, Jun. 22-27, 2014, 12 pages.

Yogatama et al., Generative and Discriminative Text Classification with Recurrent Neural Networks, Available online at: https://arxiv.org/pdf/1703.01898.pdf, May 26, 2017, 9 pages.

Zhang et al., Implicit Look-alike Modelling in Display Ads: Transfer Collaborative Filtering to CTR Estimation, Available online at: https://arxiv.org/pdf/1601.02377.pdf, Jan. 11, 2016, 12 pages.

Zhang et al., Sequential Click Prediction for Sponsored Search with Recurrent Neural Networks, Proceedings of the Twenty-Eighth AAAI Conference on Artificial Intelligence, Available online at: https://arxiv.org/pdf/1404.5772.pdf, Jul. 27-31, 2014, pp. 1369-1375.

Zhao et al., Improving User Topic Interest Profiles by Behavior Factorization, In WWW, Available online at: https://static.googleusercontent.com/media/research.google.com/en//pubs/archive/43807.pdf, May 18-22, 2015, pp. 1406-1416.

Zhao et al., MatrixWave: Visual Comparison of Event Sequence Data, In Proceedings of the SIGCHI Conference on Human Factors in Computing Systems, Apr. 18-23, 2015, pp. 259-268.

\* cited by examiner

PREDICTING AND VISUALIZING OUTCOMES USING A TIME-AWARE RECURRENT NEURAL NETWORK

TECHNICAL FIELD

This disclosure relates machine learning models. More specifically, but not by way of limitation, this disclosure involves using machine learning models to predict and visualize future outcomes based on sequences of past events, e.g. interactions between user devices and interactive computing environments.

BACKGROUND

Online content providers perform user segmentation for many reasons, such as for customization of online content, improved targeting of electronic services, and reduction of expended computing resources. For example, an online content provider may modify how an interactive computing environment, such as a website, is presented to a given user device based on a segment, or group, to which the user device is assigned (either directly or through a user associated with the device). Examples of modifications include tailoring content for a device assigned to a particular segment, more prominently displaying user interface elements for devices in a particular segment, or transmitting website suggestions devices in a particular segment.

Machine learning and statistical methods can gain valuable insights by analyzing sequences of timestamped events or user interactions. Key tasks in event sequence analytics include mining and summarizing frequent patterns, querying event sequences to build cohorts, and analyzing correlations between events and outcomes. But while some existing solutions can predict a single categorical outcome based on a sequence of events, these solutions cannot determine multiple sequential outcomes with associated probabilities. For example, existing solutions may not be able to predict a sequence of two consecutive categorical outcomes based on a set of user interactions. Further, existing solutions are unable to update these categorical outcomes when considering a hypothetical modification to one or more events.

Therefore, existing techniques may involve disadvantages for reasons such as (but not limited to) those described above.

SUMMARY

Systems and methods are disclosed herein for predicting and visualizing outcomes. For example, an analysis application accesses a sequence of events. Each event includes a timestamp at which the event occurred and a category from a set of predefined categories. The application encodes the sequence of events into a feature vector that includes, for each event, a numerical representation of (i) a respective category and (ii) a respective timestamp. The application further applies a time-aware recurrent neural network to the feature vector. The time-aware recurrent neural network outputs one or more of (i) a set of future events in which each event is associated with a probability and a predicted duration and (ii) a sequence embedding that contains information about predicted outcomes and temporal patterns observed in the sequence of events. The application applies a support vector model classifier to the sequence embedding. The support vector model classifier computes a likelihood of a categorical outcome for each of the events in the probability distribution. The application provides one or more of (i) the probability distribution or (ii) the categorical outcome to a user interface.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
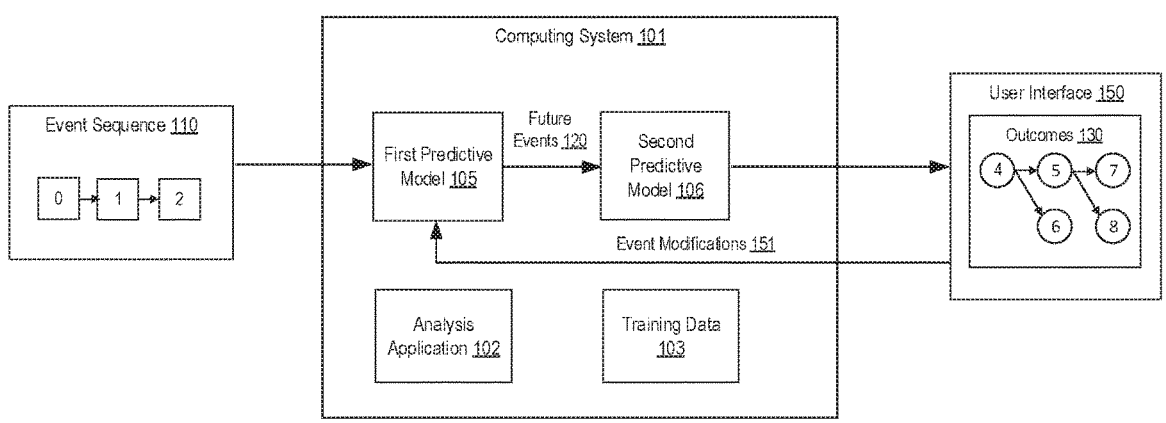
FIG. 1 is a diagram depicting an example of an outcome prediction environment, according to an embodiment of the present disclosure.

Certain embodiments provide improvements to predictive modeling of event sequences by employing one or more machine learning models. Event sequences can be derived from user interactions such as searches or following links within an interactive computing system such as a website. Such event sequences can be used to modify how the interactive computing environment is presented to certain segments of user devices.

In an example, a computing systems that hosts an interactive computing environment, logs user visits and other interactions to obtain a sequence of past interactions. These interactions, or events, can include operations performed on an interactive computing environment by a user device, such as clicking, dragging, navigation, entered search terms, and the like.

Continuing the example, disclosed solutions can apply a time-recurrent neural network to a sequence of timestamped events to determine a sequence embedding that represents one or more future events. A time-aware recurrent network (TRNN) is a long short term memory (LTSM) network that is designed to accommodate time irregularities in input sequences. In turn, disclosed solutions provide the sequence embedding from the TRNN to a trained support vector model, yielding an output of one or more categorical predictions with associated probabilities. Certain embodiments can also visualize the categorical predictions via a user interface, enabling simplified analysis of a large number of permutations of outcomes. A categorical outcome reflects a probability of a particular outcome occurring based on the event sequence.

The following non-limiting example is provided to introduce certain embodiments. An analysis application receives a sequence of events as input, for example a series of user interactions with an interactive computing environment. The analysis application applies a TRNN to the sequence of events and obtains a sequence embedding from the TRNN. The application provides the sequence embedding to a support vector model, which in turn, generates categorical outcomes and associated probabilities.

Continuing the example, the application outputs an outcome "user will continue to interact with the computing environment" with probability 0.7 and an outcome "user will not continue to interact" with probability 0.3. The analysis application further determines assuming the outcome "user will continue to interact with the computing environment" occurs, the subsequent outcome that the "will complete a purchase" has a probability of 0.9 and "will not complete a purchase" with probability 0.1.

Certain embodiments provide improvements to computing systems that predict and visualize future events in sequences of events. For instance, as noted above, existing techniques are unable to predict multiple sequential future events. These problems can be addressed by various features described herein such as the use of a time-aware recurrent neural network. More specifically, a time-aware recurrent neural network provides advantages over other techniques because a time-aware recurrent neural network considers time periods between events. This approach therefore results in improved accuracy and functionality.

Further, in contrast to existing solutions, certain embodiments can update the event sequence to reflect hypothetical future events in the sequence or alter or delete past events. An example of deleting an event is changing the sequence such that a user had not taken a drug. Disclosed solutions apply the models to the updated event sequence, thereby updating the category prediction and facilitating visualization of different scenarios.

Certain Definitions

As used herein, an "event" is an action taken by an entity or an action that may have affected an entity. An example of an entity is an individual. Non-limiting examples of events include "took a drug," "had a surgery," "the lights were turned off," "enrolled in a Spanish class," and "navigated to a web-site about cameras." In some cases, events are specific electronic interactions between a user device (e.g., a computer or mobile phone) and an interactive computing environment.

As used herein, an "outcome" is a decision taken by an entity. An outcome can be caused by or correlated with one or more events. Non-limiting examples of outcomes include "offered an internship in Spain," "recovered from surgery," and "made a purchase of a camera." Outcomes can be determined by electronic interactions between a user device and an interactive computing environment.

As used herein, a "category" is a description of an occurrence from a predefined list of categories. Categories can vary by domain. Examples of categories used in a medical domain include "drugs" or "surgeries." Examples of categories used in the educational domain include "classes" and "internships."

Turning now to the Figures, FIG. 1 is a diagram depicting an example of an outcome prediction environment, according to an embodiment of the present disclosure. FIG. 1 depicts outcome prediction environment 100, which includes computing system 101, event sequence 110, and user interface 150. Computing system 101 can determine a probability distribution of categorical outcomes. For example, from event sequence 110, computing system 101 determines that three outcomes are possible, with respective probabilities 0.8, 0.1, and 0.1. To do so, computing system 101 applies one or more models to event sequence 110, and determines one or more outcomes and associated probabilities based on the event sequence 110.

Computing system 101 includes one or more of a first predictive model 105, second predictive model 106, analysis application 102, and training data 103. Analysis application 102 can execute on computing system 101. Different types of models such as predictive models or classification models can be used. For example, the first predictive model 105 can be a time-aware recurrent neural network. A time-aware neural network is discussed further with respect to FIG. 2. The second predictive model can be a support vector model. Each model can be trained by using training data 103. An example technique for training these models is described with respect to FIG. 8.

In a more specific example, analysis application receives event sequence 110, which includes a series of medical drugs taken by a patient, the associated times at which the drugs were taken, and an associated category of the event. The analysis application transforms the event sequence 110 into a feature vector, which represents the categories and timestamps numerically. The application applies the first predictive model 105 to the events. The first predictive model 105 outputs a sequence embedding. A sequence embedding is a vector that represents a particular sequence of events, in this case, a predicted set of future events 120. The sequence embedding is a function of the model's training and also the event sequence 110.

The analysis application 102 applies the second predictive model 106 to the sequence embedding extracted from the first predictive model 105. In turn, the second predictive model 106 outputs a set of outcomes 130. The set of outcomes 130 indicates different possible outcomes and their respective probabilities.

Continuing the example, the application outputs an outcome "patient is well" with probability 0.7 and an outcome "will need surgery" with probability 0.3. The analysis application further determines assuming the outcome "will need surgery" occurs, the subsequent outcome that the "surgery will be successful" has a probability of 0.9 and "surgery will not be successful" with probability 0.1. In some cases, as discussed with respect to FIG. 5, analysis application 102 can omit or filter outcomes with probabilities below a threshold to simplify user interface 150.

In another example, analysis application 102 can receive hypothetical modifications to, deletions from, or additions to the event sequence or future events from user interface 150 and determine an updated set of outcomes 130. User interface 150 can provide tools by which a user can perform these functions. In this case, such event changes 151 are passed back into computing system 101, where event modifications 151 cause analysis application 102 to update event sequence 110. In turn, analysis application 102 applies the first predictive model 105 to the updated event sequence 110, applies the second predictive model 106 to the output from the first predictive model 105, and updates user interface 150 with updated outcomes.

Disclosed systems can be employed in different domains. In another example, analysis application 102 can segment user devices into one or more groups based on predictions obtained from the first predictive model 105 and the second predictive model 106. In this case, event sequence 110 includes events derived from user interactions with an interactive computing environment. Analysis application 102 provides event sequence 110 to the first predictive model 105 to obtain a sequence embedding. In turn, analysis application 102 provides the sequence embedding to the second predictive model 106, which outputs categorical probabilities of future events. In this case, examples of future events include whether a user device will continue to interact with the interactive computing environment and the nature of such interactions.

In some cases, based on the outcomes obtained by analysis application 102, computing system 101 or another computing device can present user devices, including user devices from which the interactions were derived, with certain interface elements that search databases for different content items, or with interface elements that cause a computing device or web server to perform one or more operations on the combination of content items (e.g., initiating a transaction to obtain a set of products, etc.). Similarly, a computing device can modify an interactive experience such as by altering the placement of menu functions, hiding or displaying content, for one or more user devices to present a different experience from other user devices to improve the user experience for those users.

Figure 2:
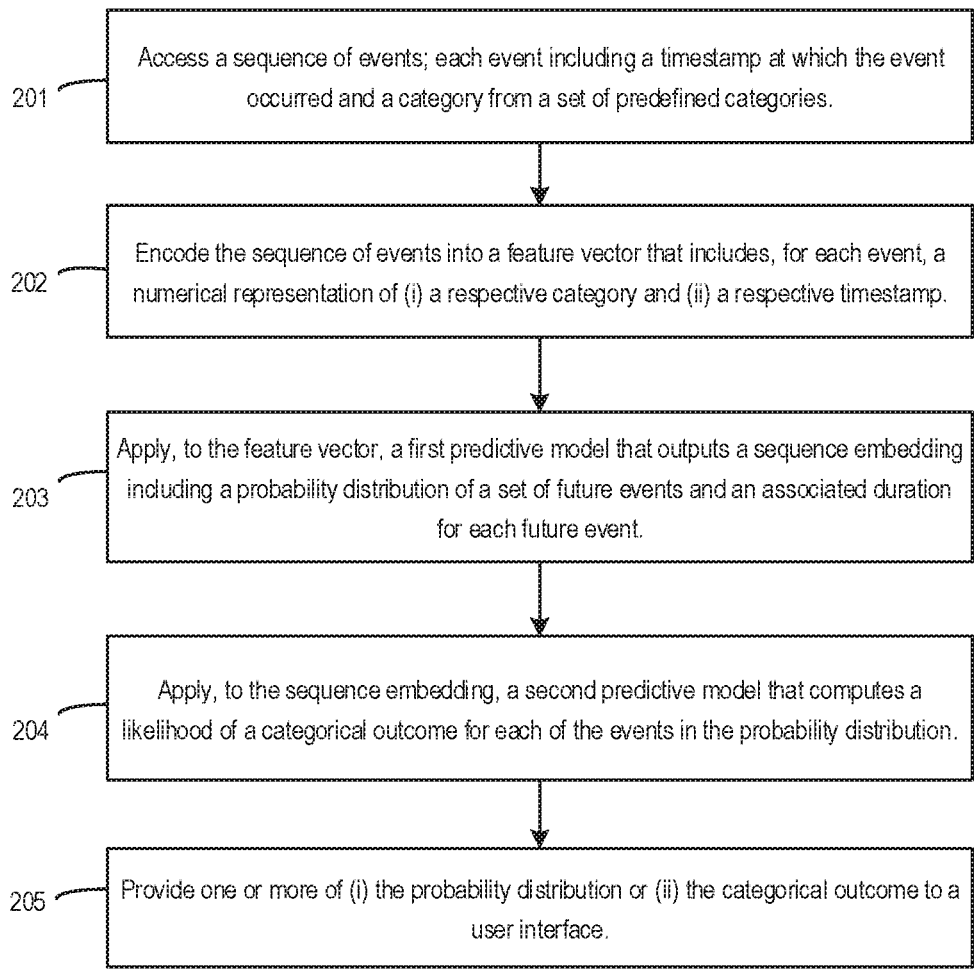
FIG. 2 is a flow chart depicting an example of a process for outcome prediction, according to an embodiment of the present disclosure.

FIG. 2 is a flow chart depicting an example of a process 200 for outcome prediction, according to an embodiment of the present disclosure. Analysis application 102 can implement process 200. For example purposes, process 200 is discussed in conjunction with FIGS. 3-5.

At block 201, process 200 involves accessing a sequence of events. Each event can include a timestamp at which the event occurred and a category of the particular event. The timestamps can be relative to a specific point in time in the past such as a first event or a particular point in time. Alternatively, the timestamps can each be relative to one another. For example, a second event can include a timestamp that is relative to a first event, and a third event can include a timestamp that is relative to a second event, and so on. The category can be from a list of predefined categories.

Figure 3:
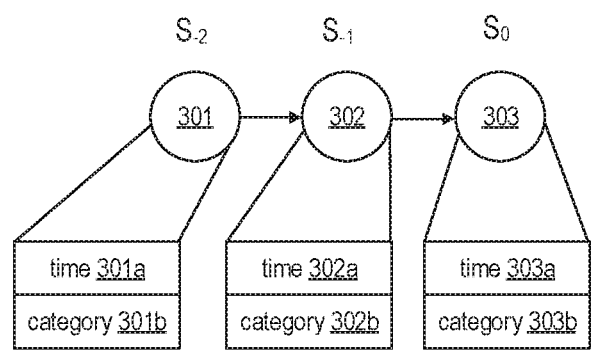
FIG. 3 depicts examples of events, according to an embodiment of the present disclosure.

FIG. 3 depicts examples of events and categorical outcomes, according to an embodiment of the present disclosure. FIG. 3 depicts example historical event sequence 300. Historical event sequence 300 includes events 301, 302, and 303, which are also referred to as $S_{-2}$, $S_{-1}$, and $S_0$ respectively. In this nomenclature, a negative index indicates the past and a zero index indicates the present. Each event 301-303 includes a time and a category. More specifically, event 301 includes time 301a and category 301b, event 302 includes time 302a and category 302b, and event 303 includes time 303a and category 303b.

Returning to FIG. 2, at block 202, process 200 involves encoding the sequence of events into a feature vector comprising, for each event, a numerical representation of (i) a respective category and (ii) a respective timestamp. Continuing the example, analysis application 102 combines events $S_{-2}$, $S_{-1}$, and $S_0$ into a feature vector. The feature vector represents, a category and a timestamp for each event in a feature space. The feature vector can have any number of dimensions. Accordingly, in the example depicted in FIG. 3, the associated feature vector may be three-dimensional, with events ($S_{-2}$, $S_{-1}$, and $S_0$) in one dimension), category in a second dimension, and time in a third dimension. In some cases, the feature vector can include event sequences from one or more entities or users, for example, determined via electronic interactions between user devices and other computing devices such as servers.

At block 203, process 200 involves applying, to the feature vector, a first predictive model that outputs a sequence embedding including a probability distribution of a set of future events and an associated duration for each future event. The first predictive model 105 can be a trained time-aware recurrent network. A TRNN is a sequence of long-short term networks (LSTM) that are chained together. A LSTM is a type of recurrent neural network.

More specifically, the TRNN is configured such that the input of each unit is the feature vector of an event in the sequence and the output of each LSTM unit is sent to the next unit for iteration. The output of each LSTM unit is recursively computed based on the input of the current unit and the output of the previous unit. Advantages of a time-aware LTSM network include accommodating time irregularities in input sequences. The T-LSTM can receive an elapsed time for each event. Elapsed time is transformed into a weight using a time decay function. Accordingly, the T-LSTM learns a neural network that performs a decomposition of the cell memory into short and long-term memories. The short-term memory is discounted by the decaying weight before combining it with the long-term counterpart. The sequence embedding of the TRNN represents an output series of predicted events.

Continuing the example, analysis application 102 provides events 301-303 to the first predictive model 105. In turn, the first predictive model 105 outputs a sequence embedding that represents one or more future events 120.

Figure 4:
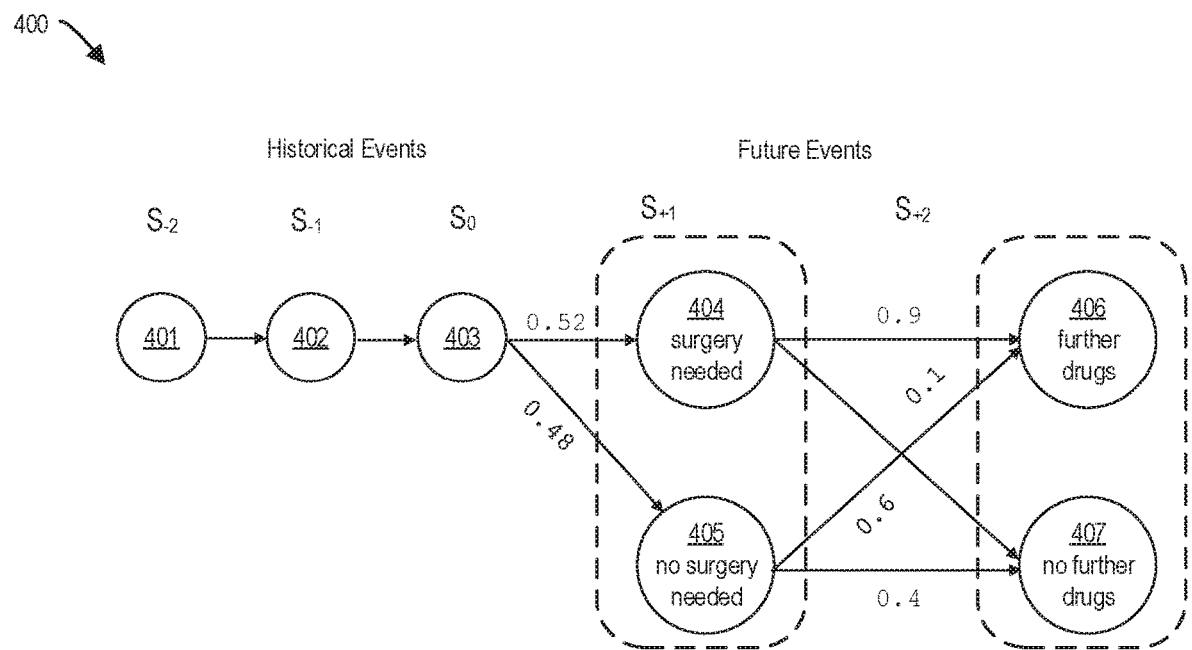
FIG. 4 depicts examples of predicted outcomes based on events, according to an embodiment of the present disclosure.

FIG. 4 depicts examples of predicted outcomes based on events, according to an embodiment of the present disclosure. FIG. 4 depicts sequence 400. Sequence 400 represents historical events 401-403 and future events 404-407. Historical events 401-403 correspond to events 301-303 respectively. Future events 404-407 are labeled $S_{+2}$ and $S_{+1}$, where a positive index indicates the future.

Returning to FIG. 2, at block 204, process 200 involves applying, to the sequence embedding, a second predictive model that computes a likelihood of a categorical outcome for each of the events in the probability distribution. The second predictive model 106 can be a support vector model. Support vector models are supervised learning models that include learning algorithms that analyze data used for classification and regression analysis.

As depicted in FIG. 4, future events 404-407 include various categories. In particular, future event 404 is labeled "surgery needed," future event 405 labeled "no surgery needed," future event 406 is labeled "further drugs," and future event 407 is labeled "no further drugs." Each future event has a different probability. For example, the probability, given historical events 401-403, of event 404 occurring is 0.52. The probability of event 405 occurring is 0.48. Moving forward, the probability of event 404 then event 406 occurring is 0.52 and then 0.9 (yielding a cumulative probability of 0.468). In contrast, the probability of event 405 and then event 406 occurring is 0.048.

Figure 6:
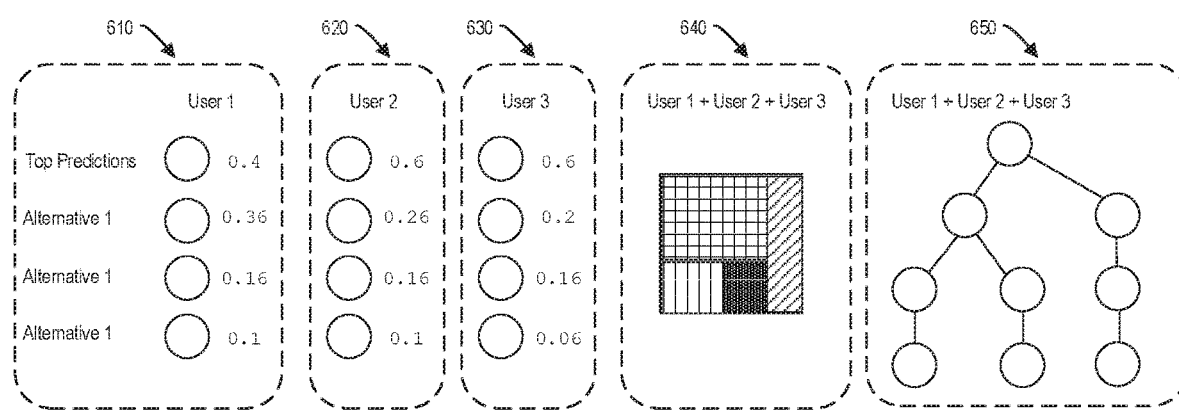
FIG. 6 depicts an example of a graphical representation of an output of an outcome prediction environment, according to an aspect of the present disclosure.
Figure 7:
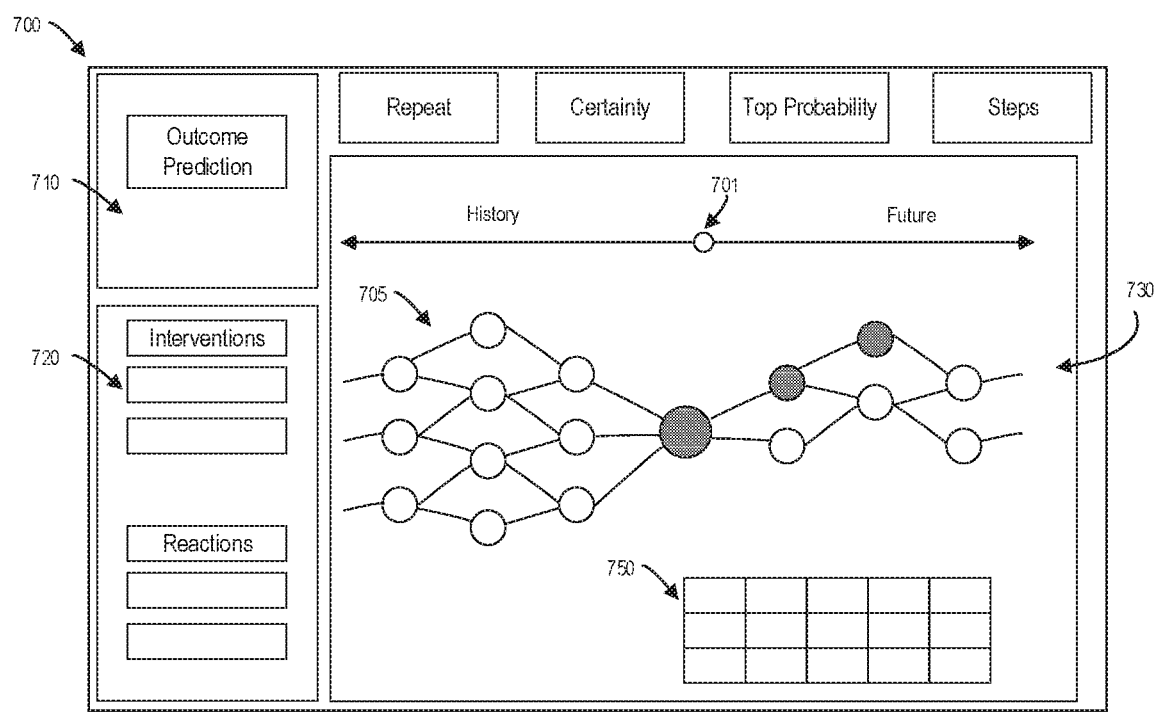
FIG. 7 depicts an example of a user interface for manipulating events within an outcome prediction environment, according to an aspect of the present disclosure.

At block 205, process 200 involves providing one or more of (i) the probability distribution or (ii) the categorical outcome to a user interface. Analysis application 102 can provide the events, categories, and probabilities to user interface 150. Different visualizations are possible. Some examples are shown in FIGS. 5-7.

A large number of probabilistic paths are possible. Each step in the prediction is a probability distribution over all available event categories, which leads to exponential growth of the number of possible paths. Each event in a series is represented by probability distributions over all the event categories. As such, there can be up to $m^n$ probabilistic future paths for each sequence, where m represents the number of event categories and n is the number of steps.

Accordingly, in some cases, analysis application 102 can output only a certain number (e.g., one or two) of the most likely predictions for each event and can aggregate the less-likely predictions by an average probability. FIG. 5 depicts one such view.

Figure 5:
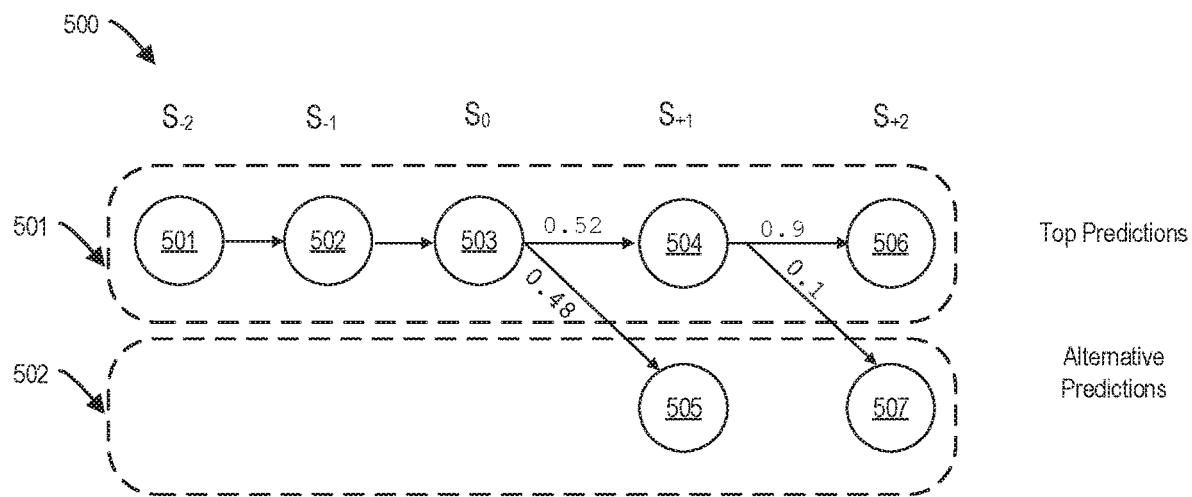
FIG. 5 depicts examples of identified top and alternative predictions, according to an embodiment of the present disclosure.

FIG. 5 depicts examples of identified top and alternative predictions, according to an embodiment of the present disclosure. FIG. 5 depicts event diagram 500. Event diagram 500 includes group 501, group 502, and events 501-507 (corresponding to events 401-407 respectively).

In this case, analysis application 102 displays the most probable future paths by preserving the most probable event at each prediction step. For example, group 501 represents a most-likely set of predictions, specifically the events 504 and 506 combined with the historical part of the sequence (events 501-503). Group 502 includes the less-likely future events 505 and 507.

Visualization

Analysis application 102 can use different visualizations to represent the categorical outcomes and respective probabilities. FIGS. 6-7 depict some examples of visualizations.

FIG. 6 depicts an example of a graphical representation of an output of an outcome prediction environment, according to an aspect of the present disclosure. FIG. 6 depicts visualizations 600, which includes aggregated visualizations 610, 620, and 630, rectangular-width representation 640, and hierarchical representation 650.

Aggregated visualizations 610, 620, and 630 each represent different users. Aggregated visualizations 610, 620, and 630, reflect aggregations of user records with the same top categorical prediction. Aggregated visualization 610 represents a first user, aggregated visualization 620 a second user, and aggregated visualization 630 a third user.

More specifically, the next event prediction of each sequence is a probability distribution over all available event categories, ordered by probabilities. The most probable event is labeled the top prediction and the rest are alternative predictions. This organization is continued for each user, e.g., with aggregated visualization 620 and aggregated visualization 630.

Rectangular-width representation 640 represents the probabilities of future categories in a set of rectangles. The width of each rectangle represents the average probability of the category. A variant (not depicted) can use color opacity to represent the average probability. Rectangular-width representation 640 is shown for three sets of user data (user 1, user 2, and user 3).

Finally, hierarchical representation 650 represents the probabilities of future categories in a tree structure. At the top, or root, is a categorical outcome, and below, as leaves or branches, are the different outcomes that can occur subsequent to the category represented by the root.

FIG. 7 depicts an example of a user interface for manipulating events within an outcome prediction environment, according to an aspect of the present disclosure. FIG. 700 depicts user interface 700. User interface 700, via outcome prediction view 710, event frequency filters 720, and event sequence view 730, facilitates inserting hypothetical future events and visualizing corresponding outcomes.

More specifically, outcome prediction view 710 shows a percentage of records that are predicted to achieve the desired outcome (which can be specified by the user). The outcome can involve planned interventions (events) or be predicted based on no additional interventions. Event frequency filters 720 show the overall distribution of events in each category.

Event sequence view 730 shows a history and future prediction of event sequences. Event sequence view 730 also provides controls for filtering events, simplifying event sequences, and exploring event sequence prediction results. Event sequence view 730 includes controls such as alignment point 701, event sequence 705, and table 750.

Event sequence 705 represents historical events and one or more predicted event sequences. For example, event sequence 705 can be determined by analysis application 102 using process 200. A user can control a number of paths that can be visualized, for example, to limit the complexity or to hide unlikely outcomes.

Alignment point 701 allows a user to graphically change a location in time, viewing past, present, and predicted future events. Analysis application 102 changes event sequence 705 in real-time according to modifications of alignment point 701.

Table 750 can include raw data such as probabilities, categories, or events. In an example, table 750 includes a column that corresponds to events and corresponding rows for each event that correspond to outcomes with the event inserted into the sequence.

Training

As discussed, embodiments of the present disclosure can use trained machine models. The first predictive model 105 and the second predictive model 106 can be trained together or separately. The expected next event and categorical outcomes obtained in process 200 are based on trained models.

Figure 8:
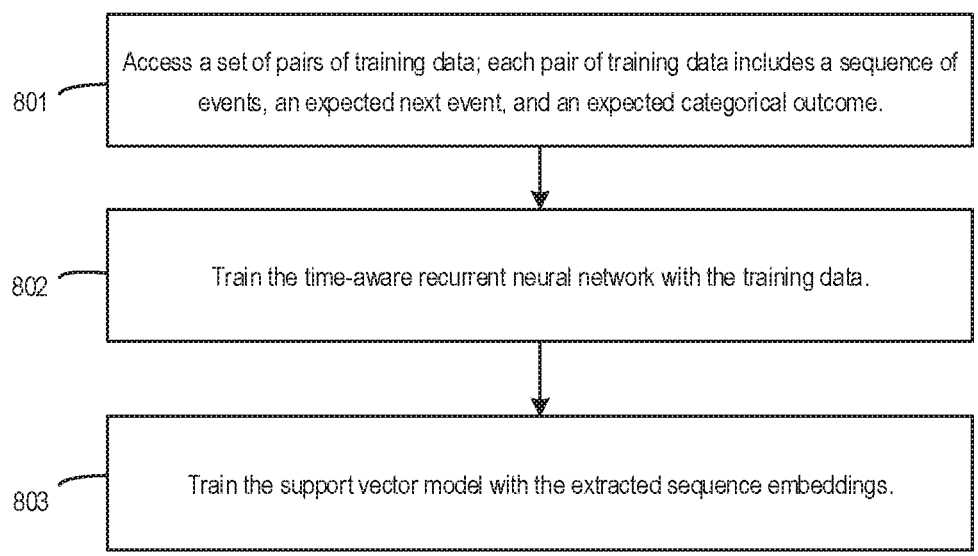
FIG. 8 is a flow chart depicting an example of a process for training one more models to predict outcomes, according to an embodiment of the present disclosure.

FIG. 8 is a flow chart depicting an example of a process 800 for training one more models to predict outcomes, according to an embodiment of the present disclosure. Process 800 involves training the first predictive model to maximize the probability of an expected next event occurring. Once the first predictive model is trained, when given an event sequence as input, a probability distribution of the next event can be derived from the output of the last LSTM unit. Probabilistic future paths can be predicted by iteratively appending the most probable next event to the input sequence. During process 800, analysis application 102 attempts to minimize a divergence between an actual event and categorical outcome and an expected actual event and categorical outcome.

At block 801, process 800 involves accessing a set of pairs of training data. Each pair of training data includes a sequence of events, an expected next event, and an expected categorical outcome.

At block 802, process 800 involves training the time-aware recurrent neural network with the training data. For example, at block 802, analysis application 102 obtains a next event from the time-aware recurrent neural network by applying the model to a pair of training data. The analysis application 102 can adjust parameters of the network such that a probability of the next event matching the expected next event is maximized. Each iteration, the analysis application 102 extracts a sequence embedding from the time-aware recurrent neural network. The sequence embedding are saved until block 803. Block 802 iteratively continues through all the sequence embeddings.

At block 803, process 800 involves training the support vector model with the extracted sequence embeddings. For example, the analysis application 102 obtains a categorical outcome by applying the support vector model to an extracted sequence embedding. The analysis application 102 receives a prediction of a categorical outcome and then adjusts one or more parameters of the support vector model such that a probability of the categorical outcome matching the associated expected categorical outcome is maximized. Block 803 iteratively continues through all the sequence embeddings.

At the conclusion of block 803, the two models are trained and can be used, e.g., in process 200.

Exemplary Computing Systems

Figure 9:
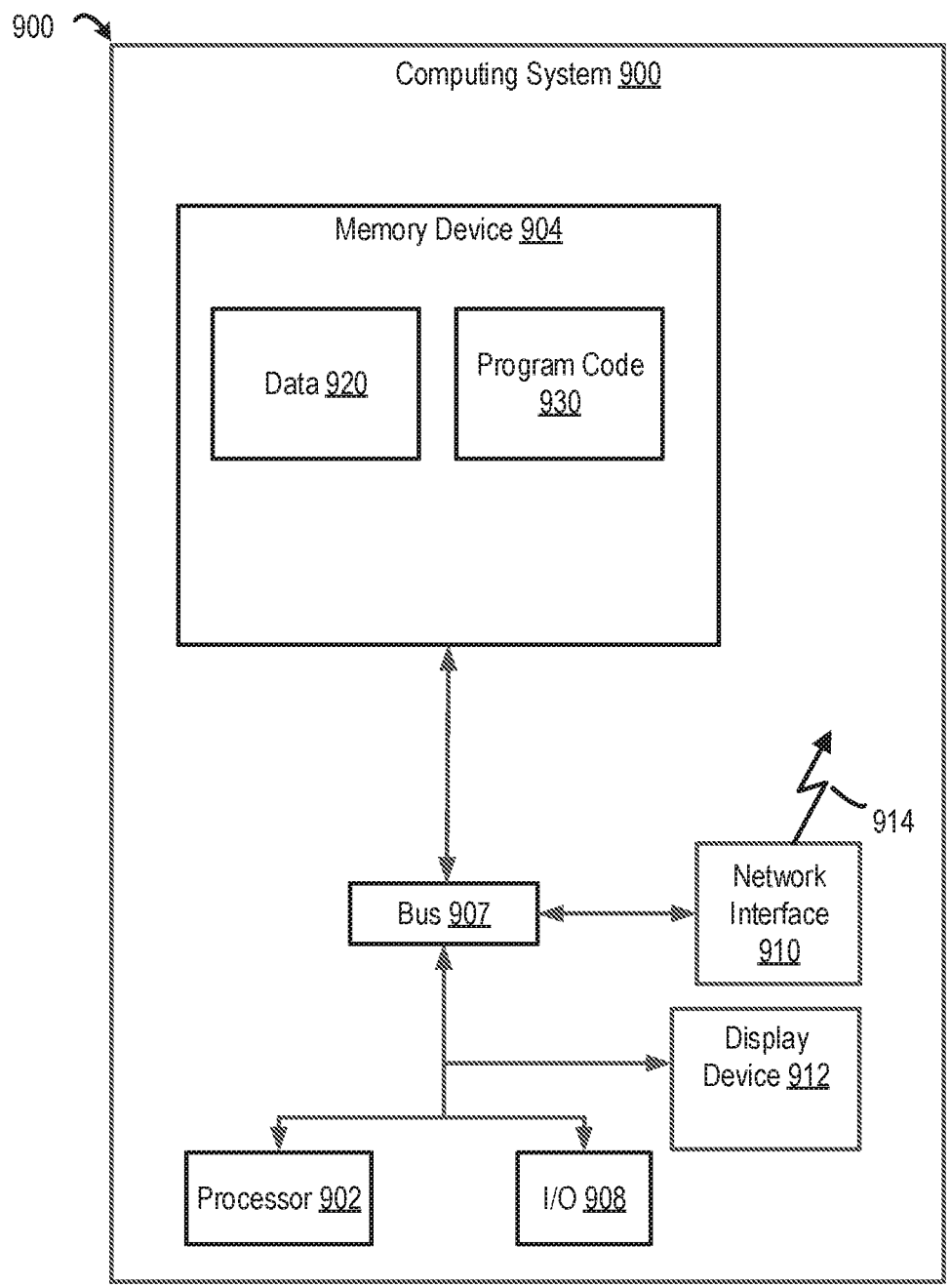
FIG. 9 is a diagram depicting an exemplary computing system for implementing a document processing application, according to an embodiment of the present disclosure.

FIG. 9 is a diagram depicting an exemplary computing system for implementing a document processing application, according to an embodiment of the present disclosure. FIG. 9 depicts computing device 900, which is an example of computing system 101 and can execute analysis application 102. Any suitable computing system may be used for performing the operations described herein. The depicted example of a computing device 900 includes a processor 902 communicatively coupled to one or more memory devices 904. The processor 902 executes computer-executable program code 930 stored in a memory device 904, accesses data 920 stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices or cores, including a single processing device. The functionality of the computing device may be implemented in hardware, software, firmware, or a combination thereof.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 900 may also include a number of external or internal devices, such as input or output devices. For example, the computing device 900 is shown with one or more input/output ("I/O") interfaces 908. An I/O interface 908 can receive input from input devices or provide output to output devices. One or more busses 907 are also included in the computing device 900. The bus 907 communicatively couples one or more components of a respective one of the computing device 900.

The computing device 900 executes program code 930 that configures the processor 902 to perform one or more of the operations described herein. For example, the program code 930 causes the processor to perform the operations described in FIG. 2 or 3.

The computing device 900 also includes a network interface device 910. The network interface device 910 includes any device or group of devices suitable for establishing a wired or wireless data connection to one or more data networks. The network interface device 910 may be a wireless device and have an antenna 914. The computing device 900 can communicate with one or more other computing devices implementing the computing device or other functionality via a data network using the network interface device 910.

The computing device 900 can also include a display device 912. Display device 912 can be a LCD, LED, touch-screen or other device operable to display information about the computing device 900. For example, information could include an operational status of the computing device, network status, etc.

General Considerations

Numerous specific details are set forth herein to provide a thorough understanding of the claimed subject matter. However, those skilled in the art will understand that the claimed subject matter may be practiced without these specific details. In other objects, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method comprising:
accessing a sequence of events, wherein each event comprises a timestamp at which the event occurred and a category from a plurality of predefined categories;
encoding the sequence of events into a feature vector comprising, for each event, a numerical representation of (i) a respective category and (ii) a respective timestamp;
applying, to the feature vector, a time-aware recurrent neural network that outputs a sequence embedding comprising a probability distribution of a plurality of future events and an associated duration for each future event, wherein the time-aware recurrent neural network accommodates time irregularities in the sequence of events;
applying, to the sequence embedding, a support vector model classifier that computes a likelihood of a categorical outcome for each of the events in the probability distribution; and
providing one or more of (i) the probability distribution or (ii) the categorical outcome to a user interface.

2. The method of claim 1, further comprising:
accessing a plurality of pairs of training data, wherein each pair of training data comprises a sequence of events, an expected next event, and an expected categorical outcome;
training the time-aware recurrent neural network by iteratively:
obtaining a next event by applying the time-aware recurrent neural network to each pair of training data;
adjusting one or more parameters of the time-aware recurrent neural network such that a probability of the next event matching the expected next event is maximized; and
extracting a sequence embedding from the time-aware recurrent neural network; and
training the support vector model classifier with each of the extracted sequence embeddings by iteratively:
obtaining a categorical outcome by applying the support vector model classifier to an extracted sequence embedding; and
adjusting one or more parameters of the support vector model classifier such that a probability of the categorical outcome matching the expected categorical outcome is maximized.

3. The method of claim 1, further comprising:
updating, via the user interface, one or more of (i) a timestamp or (ii) a category of an event in the sequence of events;
generating an updated feature vector based on the updated sequence;
computing an updated probability distribution; and
updating the user interface with the updated probability distribution.

4. The method of claim 1, further comprising:
updating, via the user interface, the sequence of events to include an additional future event;
generating an updated feature vector based on the updated sequence;
computing an updated probability distribution; and
updating the user interface with the updated probability distribution.

5. The method of claim 1, further comprising:
determining, from the plurality of future events, a sequence of future events comprising a first event and a second event;
determining that a cumulative probability of the first event and the second event occurring is greater than a cumulative probability of other sequences within the plurality of future events; and
presenting the sequence of events and associated aggregated outcomes on the user interface.

6. The method of claim 1, wherein the sequence of events is determined based on interactions between a user device and an interactive computing environment.

7. The method of claim 1, wherein the sequence of events comprises events derived from one or more activities of a plurality of users and wherein the probability distribution of a plurality of future events and the associated durations for each event are based on the activities of the plurality of users.

8. The method of claim 1, further comprising:
presenting, to the user interface, a predefined list of categories;
receiving, from the user interface, a selection of a category from the predefined list of categories;
determining one or more additional events, that if added to the sequence of events, would result in a categorical outcome matching the category; and
presenting the one or more additional events to the user interface.

9. A system comprising:
a processing device; and
a memory device communicatively coupled to the processing device and comprising program instructions, wherein when executed, cause the processing device to perform operations comprising:
accessing a sequence of events, wherein each event comprises a timestamp at which the event occurred and a category from a plurality of predefined categories;
encoding the sequence of events into a feature vector comprising, for each event, a numerical representation of (i) a respective category and (ii) a respective timestamp;
applying, to the feature vector, a time-aware recurrent neural network that outputs a sequence embedding comprising a probability distribution of a plurality of future events and an associated duration for each future event, wherein the time-aware recurrent neural network accommodates time irregularities in the sequence of events;
applying, to the sequence embedding, a support vector model classifier that computes a likelihood of a categorical outcome for each of the events in the probability distribution; and
providing one or more of (i) the probability distribution or (ii) the categorical outcome to a user interface.

10. The system of claim 9, wherein the operations further comprise:
accessing a plurality of pairs of training data, wherein each pair of training data comprises a sequence of events, an expected next event, and an expected categorical outcome;
training the time-aware recurrent neural network by iteratively:

obtaining a next event by applying the time-aware recurrent neural network to each pair of training data;

adjusting one or more parameters of the time-aware recurrent neural network such that a probability of the next event matching the expected next event is maximized; and extracting a sequence embedding from the time-aware recurrent neural network; and training the support vector model classifier with each of the extracted sequence embeddings by iteratively:

obtaining a categorical outcome by applying the support vector model classifier to an extracted sequence embedding; and adjusting one or more parameters of the support vector model classifier such that a probability of the categorical outcome matching the expected categorical outcome is maximized.

11. The system of claim 9, wherein the operations further comprise:

updating, via the user interface, one or more of (i) a timestamp or (ii) a category of an event in the sequence of events;

generating an updated feature vector based on the updated sequence;

computing an updated probability distribution; and updating the user interface with the updated probability distribution.

12. The system of claim 9, wherein the operations further comprise:

updating, via the user interface, the sequence of events to include an additional future event;

generating an updated feature vector based on the updated sequence;

computing an updated probability distribution; and updating the user interface with the updated probability distribution.

13. The system of claim 9, wherein the operations further comprise:

determining, from the plurality of future events, a sequence of future events comprising a first event and a second event;

determining that a cumulative probability of the first event and the second event occurring is greater than a cumulative probability of other sequences within the plurality of future events; and presenting the sequence of events and associated aggregated outcomes on the user interface.

14. The system of claim 9, wherein the sequence of events is determined based on interactions between a user device and an interactive computing environment.

15. A non-transitory computer-readable medium storing instructions that, when executed by one or more processing devices, cause the one or more processing devices to perform operations comprising:

accessing a sequence of events, wherein each event comprises a timestamp at which the event occurred and a category from a plurality of predefined categories;

encoding the sequence of events into a feature vector comprising, for each event, a numerical representation of (i) a respective category and (ii) a respective timestamp;

applying, to the feature vector, a time-aware recurrent neural network that outputs a sequence embedding comprising a probability distribution of a plurality of future events and an associated duration for each future event, wherein the time-aware recurrent neural network accommodates time irregularities in the sequence of events;

applying, to the sequence embedding, a support vector model classifier that computes a likelihood of a categorical outcome for each of the events in the probability distribution; and providing one or more of (i) the probability distribution or (ii) the categorical outcome to a user interface.

16. The computer-readable medium of claim 15, wherein the operations further comprise:

accessing a plurality of pairs of training data, wherein each pair of training data comprises a sequence of events, an expected next event, and an expected categorical outcome;

training the time-aware recurrent neural network by iteratively:

obtaining a next event by applying the time-aware recurrent neural network to each pair of training data;

adjusting one or more parameters of the time-aware recurrent neural network such that a probability of the next event matching the expected next event is maximized; and extracting a sequence embedding from the time-aware recurrent neural network; and training the support vector model classifier with each of the extracted sequence embeddings by iteratively:

obtaining a categorical outcome by applying the support vector model classifier to an extracted sequence embedding; and adjusting one or more parameters of the support vector model classifier such that a probability of the categorical outcome matching the expected categorical outcome is maximized.

17. The computer-readable medium of claim 15, wherein the operations further comprise:

updating, via the user interface, one or more of (i) a timestamp or (ii) a category of an event in the sequence of events;

generating an updated feature vector based on the updated sequence;

computing an updated probability distribution; and updating the user interface with the updated probability distribution.

18. The computer-readable medium of claim 15, wherein the operations further comprise:

updating, via the user interface, the sequence of events to include an additional future event;

generating an updated feature vector based on the updated sequence;

computing an updated probability distribution; and updating the user interface with the updated probability distribution.

19. The computer-readable medium of claim 15, wherein the operations further comprise:

determining, from the plurality of future events, a sequence of future events comprising a first event and a second event;

determining that a cumulative probability of the first event and the second event occurring is greater than a cumulative probability of other sequences within the plurality of future events; and presenting the sequence of events and associated aggregated outcomes on the user interface.

20. The computer-readable medium of claim 15, wherein the sequence of events is determined based on interactions between a user device and an interactive computing environment.

\* \* \* \* \*